US008924915B2

(12) United States Patent
McDowell

(10) Patent No.: US 8,924,915 B2
(45) Date of Patent: *Dec. 30, 2014

(54) USE OF METADATA FOR SEAMLESS UPDATES

(71) Applicant: Broadcom Corporation, Irvine, CA (US)

(72) Inventor: Curtis McDowell, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/893,912

(22) Filed: May 14, 2013

(65) Prior Publication Data

US 2013/0298113 A1     Nov. 7, 2013

Related U.S. Application Data

(63) Continuation of application No. 12/558,288, filed on Sep. 11, 2009, now Pat. No. 8,468,495, which is a continuation of application No. 11/156,700, filed on Jun. 21, 2005, now Pat. No. 7,600,214.

(60) Provisional application No. 60/672,048, filed on Apr. 18, 2005.

(51) Int. Cl.
G06F 9/44      (2006.01)
G06F 9/445    (2006.01)

(52) U.S. Cl.
CPC .. *G06F 8/65* (2013.01); *G06F 8/30* (2013.01); *G06F 8/20* (2013.01); *G06F 8/10* (2013.01); *G06F 8/67* (2013.01)

USPC ......................................................... 717/100

(58) Field of Classification Search
CPC ............... G06F 8/10; G06F 8/20; G06F 8/30; G06F 8/65; G06F 8/67
USPC ................................................. 717/100, 120
See application file for complete search history.

(56) References Cited

U.S. PATENT DOCUMENTS 5,634,127 A     5/1997   Cloud et al.
6,253,369 B1   6/2001   Cloud et al.
(Continued)

OTHER PUBLICATIONS

Field, John et al., "Transactors: a programming model for maintaining globally consistent distributed state in unreliable environments", ACM, SIGPLAN Notices,vol. 40(1), Proceedings of the 32nd ACM SIGPLAN-SIGACT Symposium on Principles of Programming Languages,(Jan. 2005), pp. 195-208.

(Continued)

*Primary Examiner* — Anna Deng
(74) *Attorney, Agent, or Firm* — McDermott Will & Emery LLP

(57) ABSTRACT

The invention provides a system and method for updating software in the CPU of a network device without interrupting the operation of the network device. The invention determines whether operating state information is recoverable. If it is not recoverable, then it will be stored in a metadata module or reload buffer. When the CPU is rebooted, after a software update or crash, it operates in a special reload mode and is able to recover any system state information not available in the network device from the metadata module.

20 Claims, 4 Drawing Sheets

(56) References Cited

U.S. PATENT DOCUMENTS

| | | |
|---|---|---|
| 6,567,417 B2 | 5/2003 | Kalkunte et al. |
| 6,785,261 B1 | 8/2004 | Schuster et al. |
| 6,912,668 B1 | 6/2005 | Brown et al. |
| 6,937,576 B1 | 8/2005 | Di Benedetto et al. |
| 6,993,530 B2 | 1/2006 | Lee et al. |
| 7,002,905 B1 * | 2/2006 | Khouri et al. ........... 370/216 |
| 7,082,130 B2 * | 7/2006 | Borella et al. ........... 370/389 |
| 7,088,995 B2 | 8/2006 | Rao |
| 7,177,946 B1 | 2/2007 | Kaluve et al. |
| 7,339,904 B2 | 3/2008 | Pedlar |
| 7,600,214 B2 | 10/2009 | McDowell |
| 2002/0046260 A1 | 4/2002 | Day, II |
| 2006/0132866 A1 | 6/2006 | Okamoto |
| 2006/0225032 A1 | 10/2006 | Klerk et al. |
| 2006/0236316 A1 | 10/2006 | McDowell |
| 2007/0276692 A1 | 11/2007 | Mei et al. |
| 2009/0100288 A1 | 4/2009 | Khurana et al. |
| 2010/0005459 A1 | 1/2010 | McDowell |

OTHER PUBLICATIONS

Non-Final Office Action Received for U.S. Appl. No. 11/156,700, mailed on Jul. 8, 2008, 10 Pages.

Final Office Action Received for U.S. Appl. No. 11/156,700, mailed on Dec. 5, 2008, 13 Pages.

Notice of Allowance Received for U.S. Appl. No. 11/156,700, mailed on May 29, 2009, 16 Pages.

U.S. Appl. No. 12/558,288 Non-Final Office Action mailed Nov. 9, 2011, 18 Pages.

U.S. Appl. No. 12/558,288 Non-Final Office Action mailed Nov. 15, 2011, 4 Pages.

U.S. Appl. No. 12/558,288 Final Office Action mailed Mar. 13, 2012, 17 Pages.

U.S. Appl. No. 12/558,288 Notice of Allowance mailed Feb. 14, 2013, 17 Pages.

* cited by examiner

| Initialization Table |
|---|
| Port (x) |
| Vlan (z) |
| L2 |
| L3 |
| linkscan |
| Trunk |
| Mirror |
| . |
| . |
| . |
| . |
| . |
| . |
| . |
| . |
| . |
| . |

Fig. 4

USE OF METADATA FOR SEAMLESS UPDATES

CROSS-REFERENCE TO RELATED APPLICATIONS

The present application is a continuation of U.S. patent application Ser. No. 12/558,228, filed Sep. 11, 2009, entitled "USE OF METADATA FOR SEAMLESS UPDATES," which is a continuation of U.S. patent application Ser. No. 11/156,700, filed on Jun. 21, 2005, entitled "USE OF METADATA FOR SEAMLESS UPDATES," which claims the benefit of U.S. Provisional Application Ser. No. 60/672,048, filed Apr. 18, 2005, entitled "USE OF METADATA FOR SEAMLESS UPDATES," all of which are incorporated by reference herein in their entirety.

BACKGROUND OF THE INVENTION

1. Field of the Invention

The invention relates to a method and apparatus for high performance switching in local area communications networks such as token ring, ATM, and Ethernet at any speed environments, generally known as LANs. In particular, the invention relates to a method and apparatus for updating software in a network device without disrupting the operation of the device.

2. Description of the Related Art

Computer networks are commonly used to send and receive data, to share resources, and to provide communication between remote users. As computer performance has increased in recent years, the demands on computer networks has also significantly increased; faster computer processors and higher memory capabilities require networks with high bandwidth capabilities to enable high speed transfer of significant amounts of data. Based upon the Open Systems Interconnect (OSI) 7-layer reference model, network capabilities have grown through the development of devices such as repeaters, bridges, routers, and switches, which operate with various types of communication media. Collectively, these devices may be referred to as network devices. Thickwire, thinwire, twisted pair, and optical fiber are examples of media which has been used for computer networks. The network devices may be interconnected by a high speed local data link such as a local area network (LAN), token ring, Ethernet, etc.

Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to as wirespeed or linespeed, which is the maximum speed capability of the particular network.

Referring to the OSI 7-layer reference model discussed previously, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network. The spanning tree algorithm defines a protocol for preventing data loops. Layer three switches, sometimes referred to as routers, can forward packets based upon the destination network address. Layer three switches are capable of learning addresses, maintaining tables thereof which correspond to port mappings, and changing packet data in the process. Processing speed for layer three switches can be improved by utilizing specialized high performance hardware, and off loading the host CPU so that instruction decisions do not delay packet forwarding.

BRIEF DESCRIPTION OF THE DRAWINGS

For proper understanding of the invention, reference should be made to the accompanying drawings, wherein:

FIG. 4 illustrates an example of an initialization table according to one embodiment of the invention.

DETAILED DESCRIPTION OF THE PREFERRED EMBODIMENT(S)

The present invention provides a system and method for updating software in a central processing unit (CPU) of a network device without interrupting the operation of the network device. Therefore, the present invention provides the capability for performing seamless software updates without affecting the performance or operation of the network device.

The network device of the present invention may be a switch-on-chip (SOC) with switching and computational capabilities. Additionally, the network device may be a network hardware component capable of generating, receiving and processing packets. The network device may have switching and/or routing capabilities appropriate to a local area network (LAN) or other communication network. Furthermore, the network device may include a CPU or CPU functionality, or, alternatively, may be in communication with an external CPU via a CPU interface.

Figure 1:
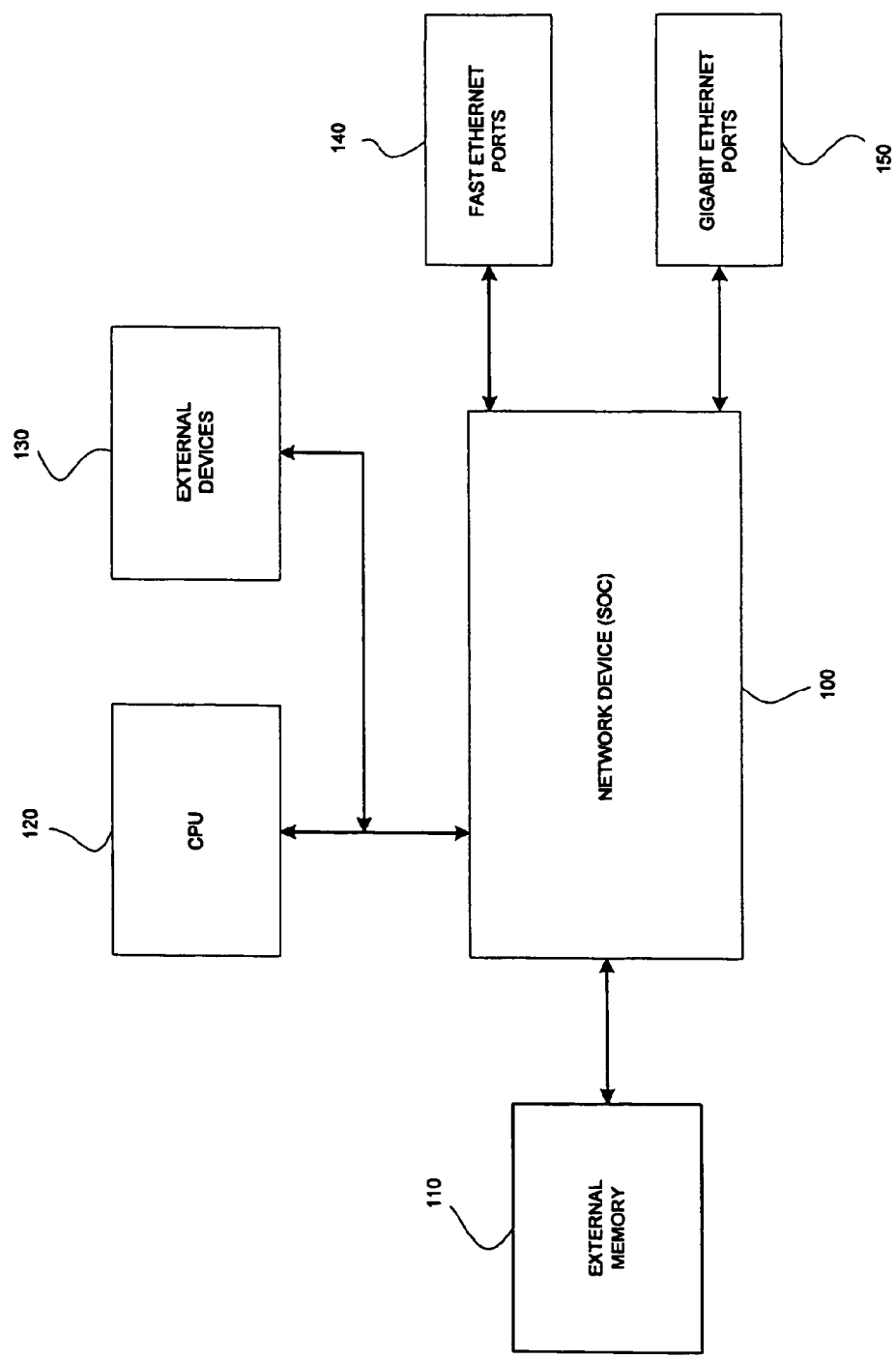
FIG. 1 illustrates a network device according to an embodiment of the invention.

FIG. 1 illustrates a system according to an embodiment of the present invention. A network device 100 is functionally connected to external devices 130, external memory 110, fast Ethernet ports 140, and gigabit Ethernet ports 150. External devices 130 may include other switching devices for expanding switching capabilities, or other devices which may be required by a specific application. External memory 110 is additional off-chip memory, which is in addition to internal memory which is located in the network device 100. CPU 120 may be used, as necessary, to program the network device 100 with rules which are appropriate to control packet processing. Once network device 100 is appropriately programmed or configured, the network device 100 will operate, as much as possible, in a free running manner without communicating with CPU 120. Involvement of the CPU 120, however, may be necessary in certain exceptional situations, as will be further discussed below. Since CPU 120 does not control every aspect of the operation of network device 100, CPU 120 performance requirements are fairly low. A less powerful and less expensive CPU 120 can therefore be used when compared to known network devices.

Any number of fast Ethernet ports 140 and gigabit Ethernet ports 150 may be provided. In addition, the ports may be 10-gigabit Ethernet ports, proprietary fabric ports, or other types of communication ports. In one embodiment of the invention, 24 fast Ethernet ports 140 and 2 gigabit ports 150 can be provided. Similarly, additional interconnect links to additional external devices 130, external memory 110, and CPU(s) 120 may be provided as necessary.

Figure 2:
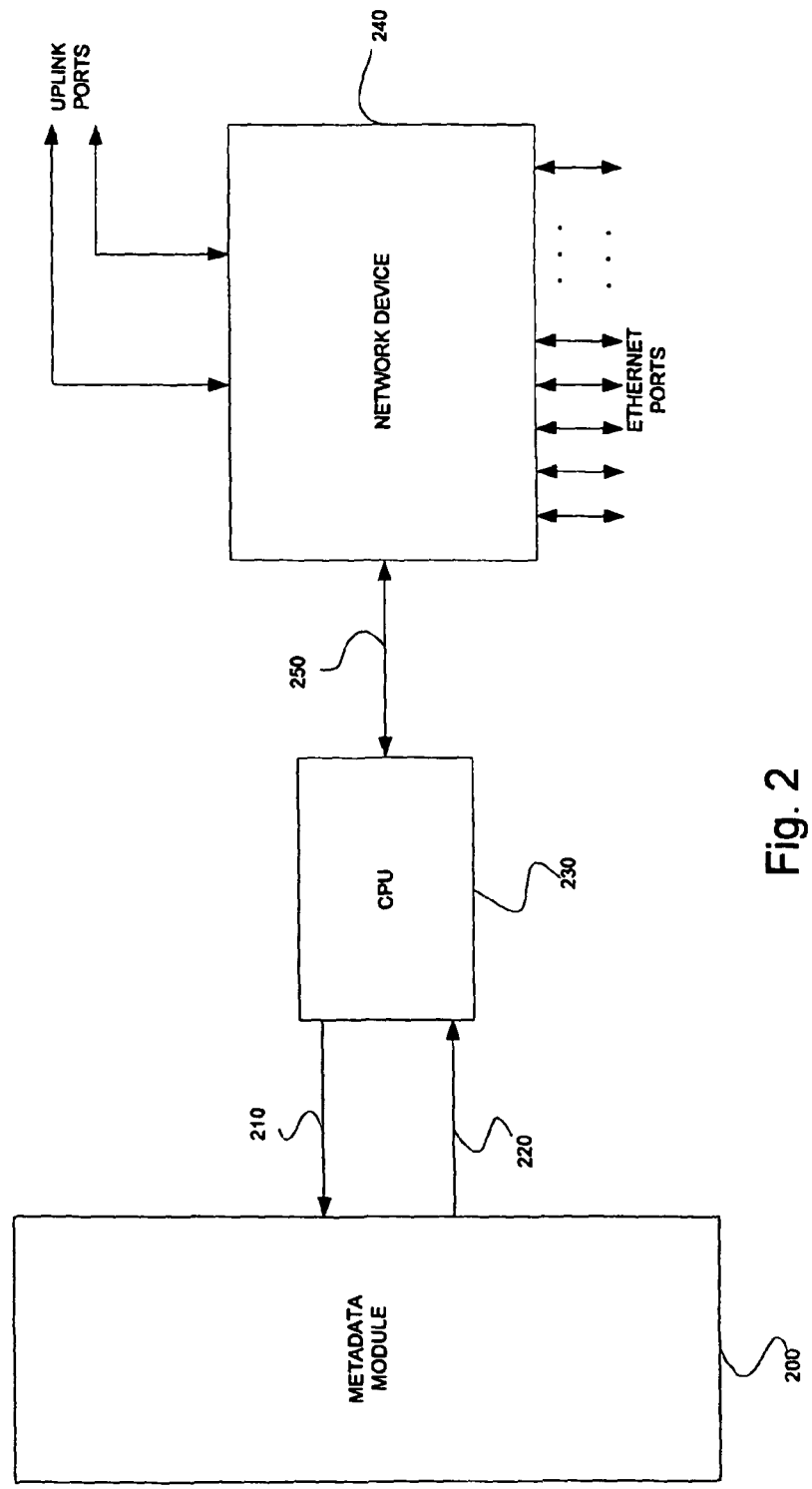
FIG. 2 illustrates a network device according to another embodiment of the invention.

FIG. 2 illustrates a system according to one embodiment of the present invention. A network device 240 with a plurality of data ports is connected to a CPU 230 via a CPU interface 250. Although, FIG. 2 illustrates the network switch with two uplink ports and six data ports, any number of data ports may be provided. The CPU 230 is connected to a metadata module 200 by links 210, 220.

During normal operation, the CPU 230 performs the protocols which may be considered relatively low bandwidth background maintenance. Occasionally, however, there is an exceptional case that will require the involvement of the CPU 230. For example, the network device 240 may receive a packet from a new host it cannot recognize. In this situation, the network device 240 forwards the packet to the CPU 230 which can run protocols to determine the host address and determine how best to handle this packet. If such an exceptional case were received by the network device 240 while the CPU 230 was not operating for any reason, the network device 240 would not be able to handle the packet properly.

The present invention provides a system and method which allows the network device 240 to continue normal operation, including the sending and receiving of data packets, while the CPU 230 is not operating for any reason. More specifically, the present invention allows the CPU 230 to be taken down, while software updates or maintenance is performed, and, when the CPU 230 is brought back on-line, the CPU 230 will be able to learn what was occurring in the network device 240 during the time period that the CPU 230 was not operating. In addition, according to an embodiment of the invention, most of the exceptional cases needing CPU involvement that are received by the network switch 240 during the time that the CPU 230 is not available, will be waiting for the CPU 230 once it is brought back on-line. Some of the exceptional cases, however, may be lost while the rest of the exceptional cases will remain queued in the hardware awaiting CPU 230 to come back on-line. The exceptional cases which may be lost are those that have already been transferred from the hardware queue to the software queue; nonetheless, it is assumed that the cases that are lost will be retried since they are made on behalf of protocols designed for unreliable network delivery.

The functionality outlined above is implemented, according to one embodiment of the invention, by providing a metadata module 200 or reload buffer for storing operating state information. The metadata module 200 may be comprised of any data storage structure, such as a database. Since some operating state information can be recovered from device configuration tables contained in the network device, not all operating state information needs to be stored in the metadata module 200. The device configuration tables contained within the network device 240 may include entries relating to port information, vlan configuration, L2 and L3 look-up tables, trunking configuration, mirroring configuration, etc. FIG. 4 illustrates an example of some of the entries in an initialization table contained within the network device.

Therefore, when an entry is made in any of the configuration tables in the network device 240, it is classified as recoverable or non-recoverable. If the information is not recoverable, then an entry containing that information is made in the metadata module 200 such that it will be available to the CPU 230. This entry can be made via the link 210. The metadata module 200 may be implemented as a non-volatile memory, a buffer memory in the CPU 230, a disk file, or flash storage. While the metadata module 200 may be implemented via numerous data structures, the metadata module 200 has a non-volatile nature in that its contents are preserved across CPU 230 restarts.

When the CPU 230 is taken down, updated, and then rebooted, it is rebooted such that it is operating in a special reload mode. The CPU 230 will then download the information stored in the configuration tables of the network device 240 via the link 250. If the CPU 230 cannot determine, via the network device configuration table information, what was occurring in the network device 240 prior to the time that the CPU 230 ceased operating, it will consult the metadata module 200. Any information that was not readily recoverable from the configuration tables in the network device 240 should be stored in the metadata module 200, and will be downloaded by the CPU 230 via the link 220. An example of an entry that is made in the metadata module 200, according to an embodiment of the invention, is a default vlan entry. The default vlan entry identifies which entry in the vlan table, which is stored in the network device 240, should be the default vlan entry.

As a result, the CPU 230 will have a clear picture of all of the events that were occurring in the network device 240 prior to the time that the CPU was not operational. Additionally, the CPU 230 will be able to handle any exceptional cases, such as those discussed above. Moreover, the network device 240 is able to continue its normal operation without disruption.

Once the CPU 230 has initialized or loaded the information it requires from the network device tables and the metadata module 200, the CPU 230 will exit the special reload mode. The operating state information stored in the metadata module 200 may only be reset upon entering global or complete initialization mode.

Figure 3:
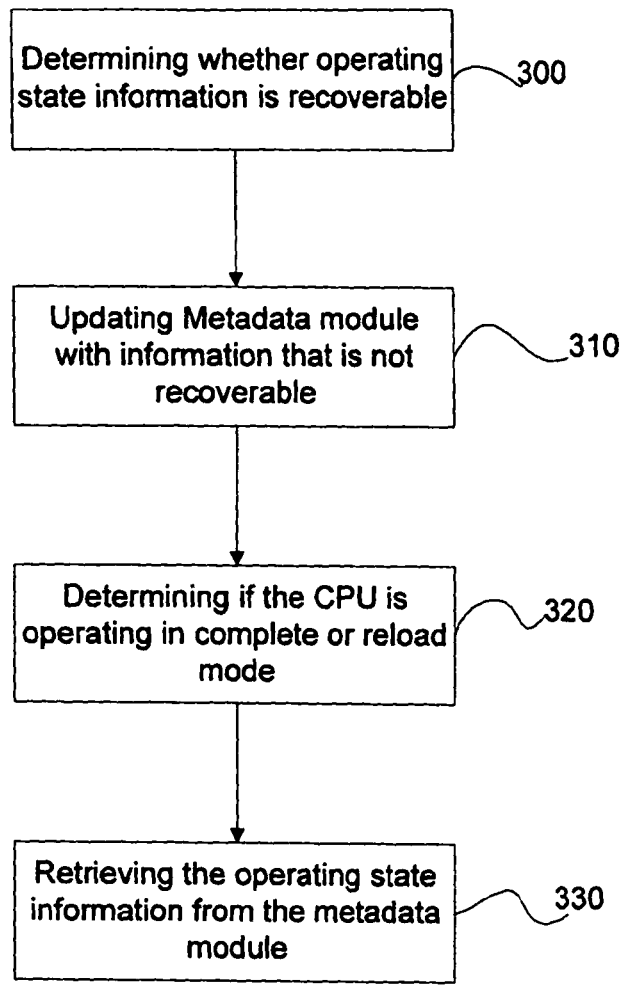
FIG. 3 illustrates a method according to an embodiment of the invention.

FIG. 3 illustrates a method according to one embodiment of the present invention. The method may include the steps of determining whether operating state information stored in configuration tables of the network device is recoverable or not 300. Operating state information that cannot be recovered by the CPU from the network device tables upon reload of the CPU may be stored in the metadata module. As such, the method also includes the step of updating the metadata module with operating state information that is not recoverable from the configuration tables within the network device 310.

Additionally, the method includes the step of determining whether the CPU is operating in complete initialization mode or reload mode 320. When the CPU crashes or an update to the software is made, the CPU is rebooted in reload mode. If the CPU is operating in reload mode, it will retrieve the information it can from the tables in the network device and retrieve all other operating state information it requires from the metadata module 330. If the CPU is operating in complete initialization mode, it will clear and reinitialize both the device configuration tables and the metadata module.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A network device, comprising:
   a central processing unit (CPU) interface for communicating with a CPU; and
   a memory configured to store operating state information;
   wherein the network device is configured to:
   receive one or more data packets for processing during a time period when the CPU is unavailable via the CPU interface;
   determine if processing of the received one or more data packets requires assistance of the CPU;
   when processing of the received one or more data packets does not require assistance of the CPU, process the received one or more data packets without assistance of the CPU; and
   when processing of the received one or more data packets requires assistance of the CPU:
   store the received one or more data packets for processing by the CPU when the CPU becomes available via the CPU interface; and
   provide to the CPU, via the CPU interface, the received one or more data packets that require assistance of the CPU when the CPU becomes available.

2. The network device of claim 1, wherein the network device is further configured to provide to the CPU, via the CPU interface, at least a portion of the operating state information from the memory when the CPU becomes available.

3. The network device of claim 1, wherein the network device is further configured to:
   determine at least a portion of the operating state information that is not recoverable; and
   store the at least the portion of the operating state information that is not recoverable in a metadata module.

4. The network device of claim 3, wherein the CPU is configured to retrieve, via another CPU interface, the at least the portion of the operating state information from the metadata module.

5. The network device of claim 1, wherein the network device is further configured to:
   when processing of the received one or more data packets requires assistance of the CPU:
   discard at least some of the received one or more data packets based at least on a transmission protocol associated with the at least some of the received one or more data packets.

6. The network device of claim 1, wherein when the CPU is operating in a reload mode, the network device is configured to update the CPU with information regarding the received one or more data packets processed by the network device while the CPU was unavailable.

7. The network device of claim 1, wherein the unavailability of the CPU via the CPU interface is due to a crash or a software update.

8. A method of operating a network device, the method comprising:
   receiving one or more data packets;
   determining a first portion of the one or more data packets that does not require assistance of a central processing unit (CPU) for processing and a second portion of the one or more data packets that requires assistance of the CPU for processing;
   during a time period when the CPU is available, processing the first portion of the one or more data packets without assistance of the CPU, and providing over a CPU interface the second portion of the one or more data packets for processing by the CPU; and
   during a time period when the CPU is unavailable, processing the first portion of the one or more data packets without assistance of the CPU, storing the second portion of the one or more data packets for processing when the CPU becomes available and, when the CPU becomes available, providing to the CPU, over the CPU interface, the second portion of the data packets for processing by the CPU.

9. The method of claim 8, further comprising:
   storing operating state information in a memory, wherein the operating state information is associated with processing the first portion of the one or more data packets; and
   providing to the CPU, over the CPU interface, the operating state information when the CPU becomes available.

10. The method of claim 9, further comprising:
    determining at least a portion of the operating state information that is non-recoverable; and
    storing the at least the portion of the operating state information in a metadata module that is external to the network device.

11. The method of claim 10, further comprising, when the CPU becomes available:
    determining whether the operating state information stored in the memory is incomplete; and
    when the operating state information stored in the memory is incomplete:
    retrieving the at least the portion of the operating state information from the metadata module; and
    providing to the CPU, over the CPU interface, the at least the portion of the operating state information retrieved from the metadata module.

12. The method of claim 8, further comprising, when the CPU is operating in a reload mode, providing to the CPU, over the CPU interface, information regarding the first portion of the one or more data packets processed while the CPU was unavailable.

13. The method of claim 8, further comprising determining an availability of the CPU via the CPU interface.

14. The method of claim 8, further comprising:
    during a time period when the CPU is unavailable, dropping at least some of the second portion of the one or more data packets based at least on a transmission protocol associated with the at least some of the second portion of the one or more data packets.

15. A computer program product comprising instructions stored in a non-transitory computer-readable storage medium, the instructions comprising:
    instructions for receiving data packets;
    instructions for determining one of the data packets that does not require assistance of a central processing unit (CPU) for processing and another of the data packets requires assistance of the CPU for processing;
    instructions for determining whether the CPU is available;
    instructions for, when the CPU is available, processing the one of the data packets that can be processed without assistance of the CPU;
    instructions for, when the CPU is unavailable, storing the another of the data packets until the CPU becomes available; and
    instructions for providing, over a CPU interface to the CPU, the another of the data packets when the CPU becomes available.

16. The computer program product of claim 15, wherein the instructions further comprise:
    instructions for storing, in a memory, operating state information; and instructions for, when the CPU becomes available, providing at least some of the operating state information from the memory to the CPU via the CPU interface.

17. The computer program product of claim 16, wherein the instructions further comprise:
   instructions for determining at least a portion of the operating state information that is non-recoverable; and
   instructions for storing the at least the portion of the operating state information that is non-recoverable in a metadata module.

18. The computer program product of claim 17, wherein the instructions further comprise:
   instructions for determining that the CPU is operating in a complete initialization mode after providing the at least some of the operating state information and the at least the portion of the operating state information; and
   instructions for clearing the memory and the metadata module based at least on determining that the CPU is operating in the complete initialization mode.

19. The computer program product of claim 15, wherein the instructions further comprise:
   instructions for providing the CPU, via the CPU interface, with information regarding the one of the data packets that was processed.

20. The computer program product of claim 15, wherein the instructions further comprise:
   instructions for dropping the another of the data packets while the CPU is unavailable when the another of the data packets is associated with a retransmission protocol.

* * * * *